Feb. 18, 1941. W. M. HAESSLER 2,232,111
RAILWAY TRUCK
Filed Jan. 7, 1938 3 Sheets-Sheet 3
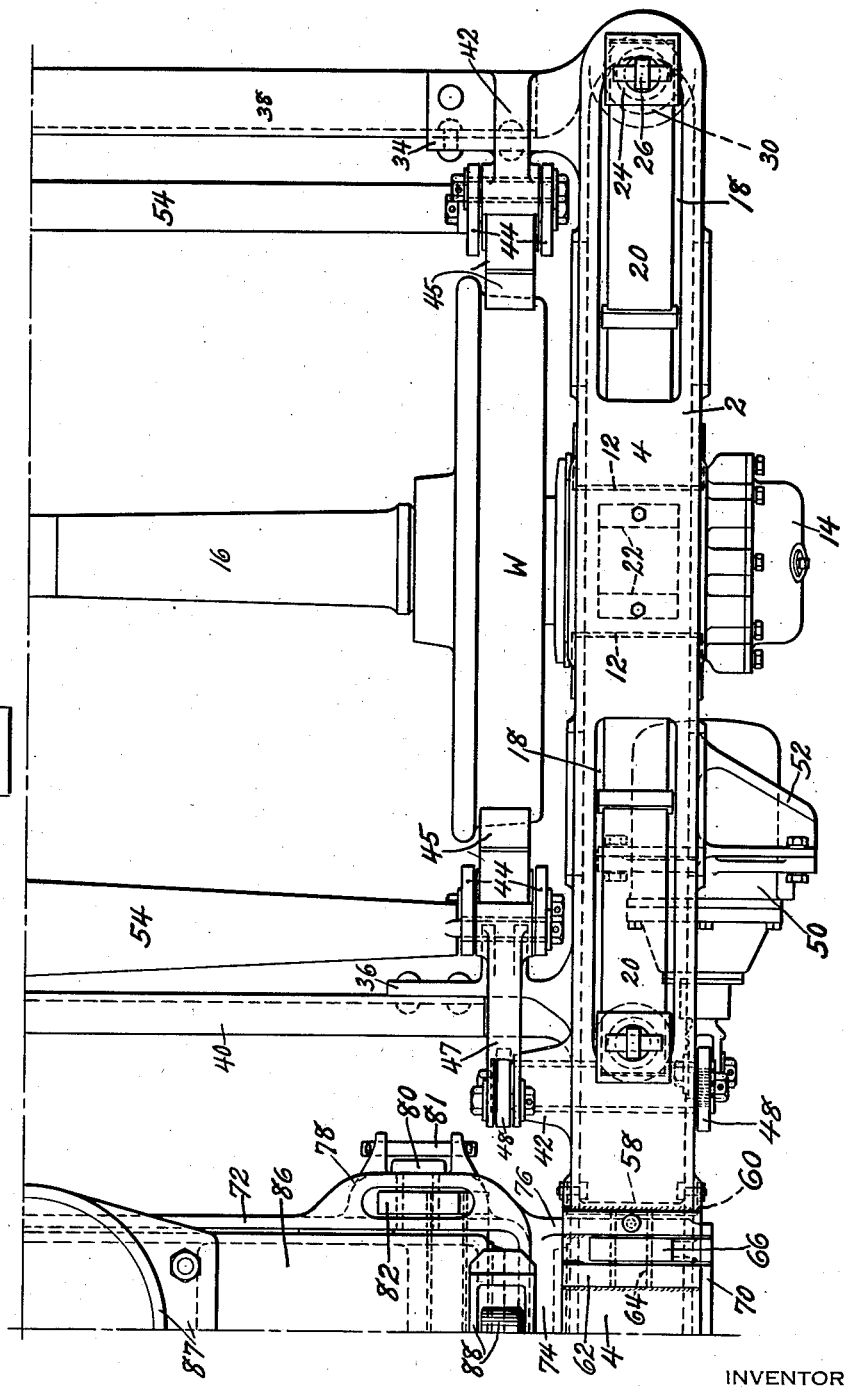
INVENTOR
Walter M. Haessler
BY
Donald U. Rich
ATTORNEY Patented Feb. 18, 1941

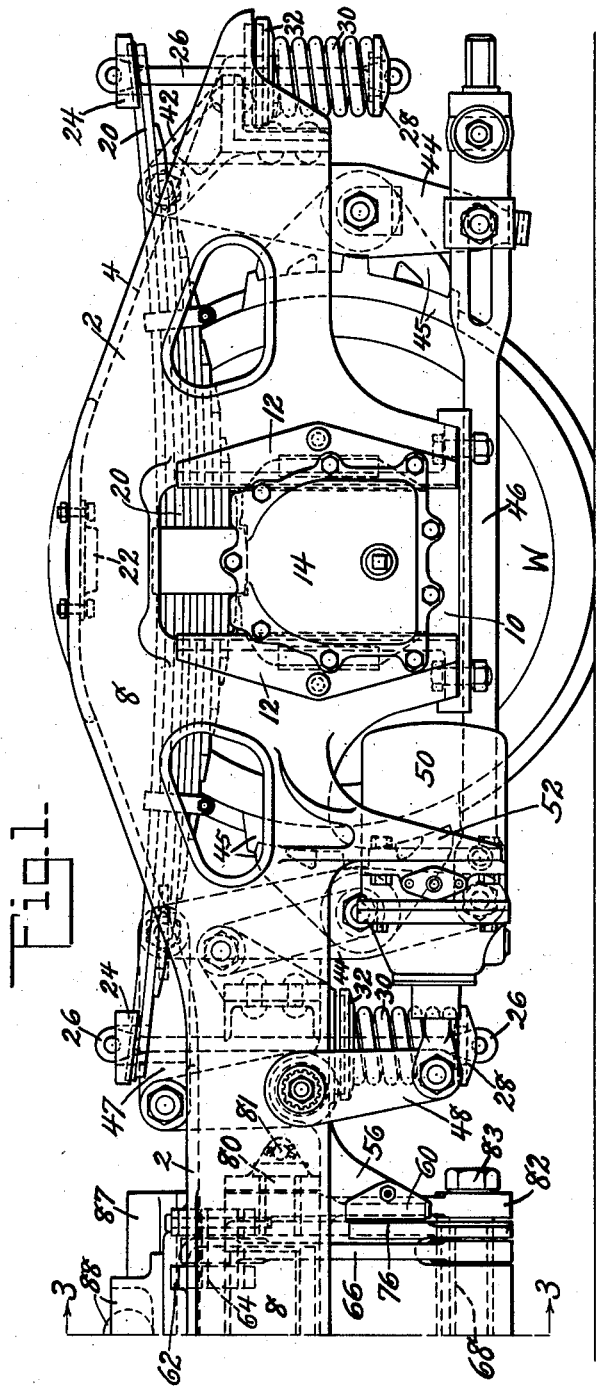

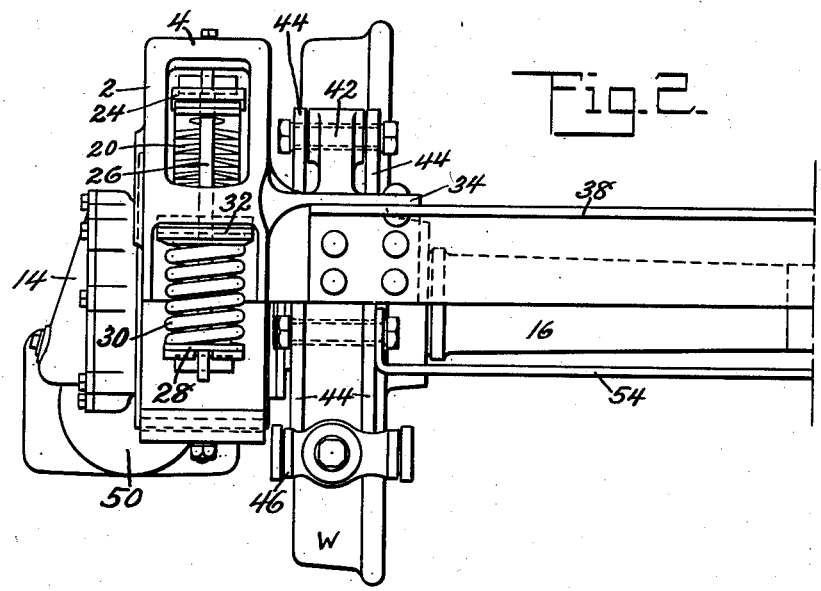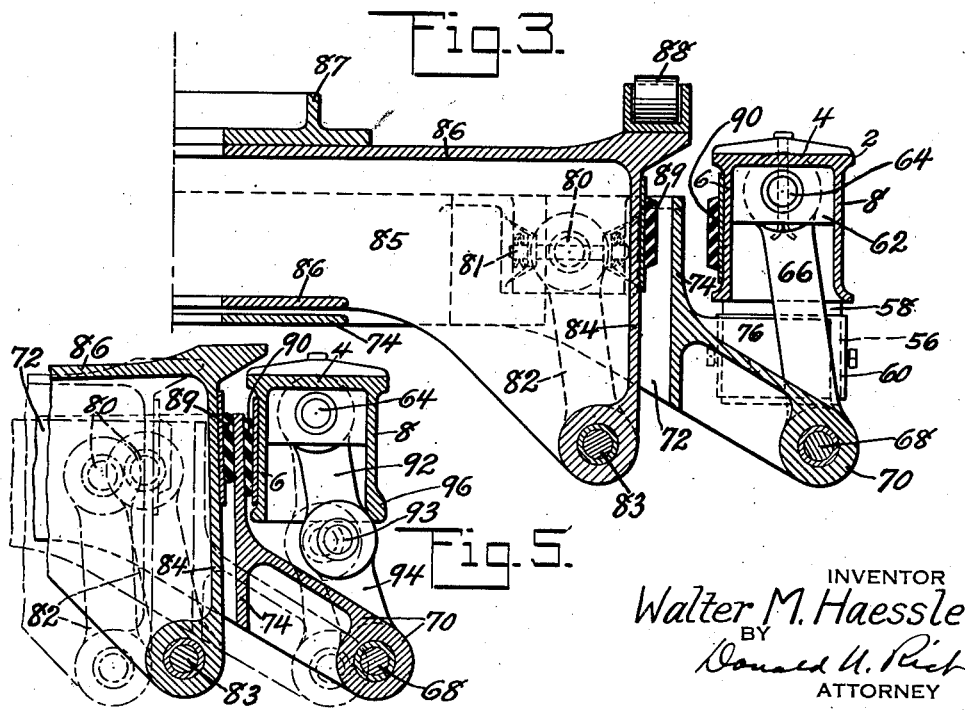

2,232,111

UNITED STATES PATENT OFFICE 2,232,111

RAILWAY TRUCK

Walter M. Haessler, Berwick, Pa., assignor to American Car and Foundry Company, New York, N. Y., a corporation of New Jersey Application January 7, 1938, Serial No. 183,775

6 Claims. (Cl. 105—190)

This invention relates in general to trucks and in particular to railway trucks for passenger cars or other cars intended for high speed service.

Railway trucks as previously built have been exceedingly heavy and the use of heavy car bodies necessitated heavy springs which in most cases have been very sluggish and could not absorb the high frequency shocks incident to high speed travel. These relatively hard riding trucks necessitated the provision of relatively great clearances between the side bearings as well as lateral motion devices which of themselves were relatively harsh in their checking of the lateral thrusts incident to travel. It is an object, therefore, of the present invention to provide an easy riding truck with very soft springing for reducing variations in rail pressures, thus permitting high speed operation with greater comfort and safety due to the more ready absorption of shocks of all frequencies.

A further object of the invention is the provision of a truck in which the unsprung weight is reduced to an absolute minimum.

A still further object of the invention is the provision of a truck with dual action lateral motion bolsters which will permit comparatively great lateral movement without great resistance to light lateral impacts, while providing for continued lateral movement with large resistance with the absorption of large lateral impacts.

A yet further object of the invention is the provision of an easy riding truck having twin bolsters independently movable and with each mounted by a hanger system giving different degrees of resistance to lateral motion of the car body and which hangers are connected in series in order to give for at least a part of the time the equivalent of a long hanger.

These and other objects of the invention will be apparent to persons skilled in the art from a study of the following description and accompanying drawings, in which Figure 1 is a side view of substantially one-quarter of the truck;

Fig. 2 is an end view showing a portion of the truck of Figure 1;

Fig. 3 is a sectional view taken substantially on line 3—3 of Figure 1;

Fig. 4 is a plan view showing substantially one-quarter of the truck; and

Fig. 5 is a detail sectional view similar to Fig. 3 but showing a modification of the hanger systems.

Referring now to the drawings in detail, it will be seen that only one-fourth of the truck has been shown, but it is to be understood that the truck is substantially symmetrical about both the longitudinal and transverse axes and, therefore, a description of any quarter of the truck will apply to the remaining quarters. For illustrative purposes, the truck side frame 2 has been shown as cast in one piece and of generally downwardly opening channel cross section having top web 4 and inner and outer flanges 6 and 8 respectively. The inner and outer flanges are increased in depth adjacent the ends of the frame in order to provide pedestal openings 10 to which the usual pedestal wear plates 12 are attached in order to guide the journal box 14 supported on the journals of axles 16 which are in turn supported by the wheels W. The web portion 4 of the side frame is provided with openings 18 on either side of the pedestal jaws in order to receive the ends of semi-elliptic spring 20, the center of which rests upon the journal box and may under exceptional load contact the buffer block 22 carried by the web 4 immediately above the journal box. The ends of the semi-elliptic spring are provided with seats 24 adapted to support one end of rod 26, the other end of which supports a spring seat 28 having a coil spring 30 supported thereon and in turn supporting the truck frame through spring seats 32. The inner flange 6 is formed with angular shaped projections 34 and 36 respectively adapted to receive end cross ties 38 and transom 40. The truck frame is also provided with brackets 42 adapted to support brake hangers 44 carrying brake shoes 45 and actuated through suitable linkage 46 and 47 and bell-crank 48 by cylinder 50 carried outside the frame by bracket 52 cast integral with the lower edge of flange 8. The customary brake beams 54 are provided in order that suitable hand operation may be obtained. The location of the brake cylinder and its peculiar connection to the brake shoe levers permits the placing of the cylinder within the clearance limits of the truck and in such a position as to not interfere with any support structure or equipment carried thereby.

Side frame flanges 6 and 8 are formed with downwardly projecting gussets 56 adjacent the transverse center and the inner edge of these gussets is joined by web 58 which effectively ties the flanges together and provides a seat for bolster wear plate 60 adapted to engage and limit longitudinal movement of the swing bolsters later to be described. The side frame web 4 substantially above the bolster wear plates is provided with an opening within which a pair of spaced bearing blocks 62 may be securely welded, thus providing a bearing for hanger pin 64. This hanger pin supports the upper end of hanger link 66, the lower end of which carries pin 68 extending through openings in projection 70 of what may be termed the outer or secondary bolster. This outer or secondary bolster is formed by side members 72 joined together at their ends and center by web plates 74, with the end web plate carrying the projection 70 previously referred to as well as an upstanding flange 76 adapted to contact the wear plate 60 and prevent longitudinal movements of the bolster. The side pieces 72 are provided on their outer sides with outstanding projections 78 adapted to receive a short hanger pin 80 held in place by any suitable means, such as rod 81. The upper end of a second hanger link 82 is supported upon this short hanger pin, while the lower end receives and supports a pin 83 extending through openings in the main or primary bolster adjacent the lower edge of the bolster end wall 84. In the present instance the main or primary bolster is of generally box section having side walls 85 connected by top and bottom walls 86, the former carrying center plate 87 and side bearings 88. In order that the primary bolster will not directly contact the secondary bolster a rubber buffer pad 89 is attached to the primary bolster wall 84, while a similar buffer pad 90 is attached to the truck side frame to prevent metallic contact between the secondary bolster and the side frame.

Referring now to Figure 5 in which a slight modification is disclosed, it will be seen that the major portion of the construction is identical with that previously described and accordingly the same reference numerals have been applied. The main difference between this modification and that previously described appears in the type of outer hanger used. In this modification the hanger pin 64 supports the upper end of an upper link 92 which in turn pivotally supports through pin 93 a lower link 94 connected to pin 68 and accordingly supporting the outer or secondary bolster. It is to be noted in connection with this figure that the upper link is of such a length that either the shank portion or the head portion may strike some part of the truck side frame such as the enlarged lower edge 96 of the outer flange 8, thus limiting its movement.

The operation of the truck shown in Figures 1 to 4 is believed obvious, since any vertical shocks imparted to the wheels will be absorbed between the journal box and the truck frame and not be transmitted to the car body to any appreciable degree. All lateral shocks or impacts will be resisted by the swing hangers 66 and 82 since any movement between the bolsters and the side frame will cause a swinging of the links and a lifting of the car body, thus the weight of the car body will of itself tend to hold the bolsters centered and any movement from this position will be materially resisted. Referring now to Figure 3 and considering the side frame as being held rigid and an impact applied to the center plate and acting toward the right hand edge of the figure, it will be seen that the primary bolster will move toward the right causing link 82 to assume some angular position with a portion of the force received by the secondary bolster and causing the outer hanger 66 to assume some angular position substantially similar to that assumed by hanger 82, thus it will be seen that hangers 82 and 66 through the secondary bolster will act in series and permit a movement of the primary bolster equivalent to that which it would have if it were hung on a single long hanger of greater length than either of the hangers 82 and 66. As soon as one or the other of the bolsters strikes its rubber buffer, then the respective link will become ineffective and the system will swing on the remaining hanger; that is, assuming buffer 89 to come in contact with wall 74, the hanger 82 can no longer move and the hanger 66 then is the sole means resisting the lateral movement. It will, therefore, be apparent that the primary bolster may move a relatively large amount without any great resistance up to the point at which one or the other set of hangers becomes ineffective, but that after one set becomes ineffective then further lateral movement is relatively slight, while the resistance thereto increases very rapidly. With this arrangement a large amount of lateral movement may be permitted between the truck body and the truck frame; that is, the truck for all purposes may be considered as floating beneath the car body, permitting high operating speeds without transmission of lateral or nosing shocks to the body. It will also be apparent that with the arrangement as described a dual hanger action is obtained with the hangers arranged within clearance limits, yet giving in effect the equivalent of an extremely long single hanger, the use of which would be impossible due to clearance limitations. Under certain circumstances it may be desirable to provide a truck with less abrupt change from the ineffective long hanger to the short active hanger, therefore, the arrangement as shown in Figure 5 would be suitable. In this arrangement the assembly in swinging from the position shown in line and dash to that shown in full line will have a movement equivalent to that which would be obtained by two relatively long hangers and one relatively short hanger acting in succession with the relatively long hangers being of an effective length greater than the length of either component hanger. In the movement of the primary bolster from the line and dash to the full line position the inner hanger and the jointed outer hanger will move in unison in exactly the same manner as that described in connection with Figure 3 up to the point at which the upper link 92 contacts the enlargement 96 of the side frame. As soon as the upper link contacts the side frame, then link 82 and lower link 94 will act in unison until one or the other of the buffer pads contacts, after which the remaining link will be the sole link acting to resist lateral movement. With this arrangement a motion is obtained equivalent to that obtained with a long hanger followed in succession by hangers of decreasing lengths, thus giving a smooth transition from the comparatively long hanger by the systems acting in series to the short hanger of either system which remains active.

In referring to the hanger systems no definite reference has been made to the exact sequence of operation of the links since this sequence may be changed by a choice of the angular position of the inner and outer links as well as by proportioning the spacing of the buffers 89 and 90 from their contacting element. It will be obvious that if desired either the outer or inner hangers or both may be jointed and cause to act in sequence in a manner similar to that described in connection with Figure 5 and this modification, as well as all other modifications or rearrangements of parts are contemplated as will fall within the scope of the following claims.

What is claimed is:

1. In combination, a car truck including side frames, wheels and axles for supporting the car truck, springs directly supporting said side frames upon the axles, a primary bolster, a secondary bolster, a first set of links directly connecting said bolsters for relative movement laterally of the truck, a second set of links directly connecting said secondary bolster and side frames for definite predetermined lateral movement of the bolster relative to the truck, at least one set of links being jointed to form upper and lower link sections, said sets of links being connected in series thereby permitting relatively large lateral movements of the primary bolster, and stop means successively limiting the movement of said links and link sections whereby the resistance to lateral movement of the primary bolster is successively and progressively increased.

2. In combination, a car truck including side frames, wheels and axles for supporting the car truck, springs directly supporting said side frames upon the axles, a primary bolster, a secondary bolster, a first set of links directly connecting said bolsters for predetermined relative movement laterally of the truck, a second set of links directly connecting said secondary bolster and side frames for lateral movement of the bolster relative to the truck, said second set of links being jointed to form upper and lower link sections, said sets of links being connected in series thereby permitting relatively large lateral movements of the primary bolster, and stop means successively limiting the movement of said links and link sections whereby the resistance to lateral movement of the primary bolster is successively and progressively increased.

3. In combination, a car truck including side frames, wheels and axles for supporting the car truck, springs directly supporting said side frames upon the axles, bearings formed on said side frames intermediate said axles, a primary bolster, a secondary bolster, bearings formed on said bolsters, a first set of links directly connecting said primary and secondary bolster bearings for relative lateral movement, a second set of links directly connecting certain of said secondary bolster bearings and said side frame bearings for lateral movement of the bolster relative to the truck, at least one set of links being jointed to form upper and lower link sections, said sets of links being connected in series for interdependent lateral movements of the bolsters, and stop means successively limiting the movement of said links and link sections whereby the resistance to lateral movement of the primary bolster is successively and progressively increased.

4. In combination, a car truck including side frames, wheels and axles for supporting the car truck, springs directly supporting said side frames upon the axles, bearings formed on said side frames intermediate said axle, a primary bolster, a secondary bolster, bearings formed on said bolsters, a first set of links directly connecting said primary and secondary bolster bearings for relative lateral movement, a second set of links directly connecting certain of said secondary bolster bearings and said side frame bearings for lateral movement of the bolster relative to the truck, said sets of links being connected in series for interdependent lateral movements of the bolsters, and stop means successively limiting the movement of said sets of links whereby the resistance to lateral movement of the primary bolster is successively and progressively increased, said second set of links being formed by upper and lower portions pivoted together with said upper portion so positioned as to strike the side frame as a stop thereby increasing the successive changes in resistance to bolster lateral movement.

5. In combination, a car truck including side frames, wheels and axles for supporting the car truck, springs directly supporting said side frames on the axles, transoms connecting the side frames, a primary bolster provided with a center bearing, and side bearings and depending arms beneath the side bearings, a secondary bolster of rectangular form substantially surrounding said primary bolster and formed with depending arms projecting outwardly beneath the side frames, a first set of links directly connecting said secondary bolster and the depending arms of said primary bolster for relative movement of the primary bolster laterally of the truck and secondary bolster, a second set of links directly connecting the depending arms of said secondary bolster and said side frames for definite predetermined lateral movement of the secondary bolster relative to the truck, said sets of links being connected in series thereby obtaining the equivalent of long links directly supporting the primary bolster from the side frame, and stop means limiting the action of one of said sets of links whereby the primary bolster is supported upon the remaining set of links for continued predetermined lateral movement.

6. In combination, a car truck including spaced apart side frames, wheels and axles for supporting the car truck, springs directly supporting said side frames upon the axles, bearings formed upon said side frames intermediate the axles, a primary bolster provided with a center bearing and side bearings and depending arms located substantially beneath the side bearings, a secondary bolster substantially surrounding said primary bolster and formed with outwardly and downwardly directed arms projecting beneath the side frames, bearings formed on said bolsters, a first set of swing links directly connecting certain of the bearings on said primary and secondary bolsters, a second set of swing links directly connecting certain of said secondary bolsters and said truck frame bearings, said sets of links being connected in series for interdependent movements of the bolsters laterally of the truck, and stop means successively limiting the movement of said sets of links whereby the resistance to lateral movement of the primary bolster is successively and progressively increased, said second set of swing links being formed by upper and lower portions pivoted together, with said upper portion positioned within a part of said truck frame so as to strike the side frame as a stop, thereby increasing the successive changes in resistance to lateral movement of the primary bolster.

WALTER M. HAESSLER.